(12) United States Patent
Bornegard et al.

(10) Patent No.: US 11,413,714 B2
(45) Date of Patent: Aug. 16, 2022

(54) METHOD FOR PRODUCING A BRAZED PLATE HEAT EXCHANGER

(71) Applicant: SWEP INTERNATIONAL AB, Landskrona (SE)

(72) Inventors: Niclas Bornegard, Bjarred (SE); Sven Andersson, Hassleholm (SE); Hans Andre, Helsingborg (SE)

(73) Assignee: SWEP INTERNATIONAL AB, Landskrona (SE)

( * ) Notice: Subject to any disclaimer, the term of this patent is extended or adjusted under 35 U.S.C. 154(b) by 203 days.

(21) Appl. No.: 16/962,072

(22) PCT Filed: Jan. 16, 2019

(86) PCT No.: PCT/EP2019/050993
§ 371 (c)(1),
(2) Date: Jul. 14, 2020

(87) PCT Pub. No.: WO2019/141701
PCT Pub. Date: Jul. 25, 2019

(65) Prior Publication Data
US 2020/0338674 A1    Oct. 29, 2020

(30) Foreign Application Priority Data

Jan. 16, 2018   (SE) .................................. 1850045-4

(51) Int. Cl.
*B23K 1/00* (2006.01)
*B23P 15/26* (2006.01)
*F28F 3/08* (2006.01)

(52) U.S. Cl.
CPC ............... *B23P 15/26* (2013.01); *F28F 3/08* (2013.01); *B23K 1/0012* (2013.01); *F28F 2275/04* (2013.01)

(58) Field of Classification Search
CPC ....... B21D 53/04; B21D 53/045; B23P 15/26; F28F 2275/04; F28F 2275/045; B23K 1/0012; B23K 2101/14
See application file for complete search history.

(56) References Cited

U.S. PATENT DOCUMENTS

| 2004/0181941 A1 | 9/2004 | Johannes et al. |
| 2016/0250703 A1 | 9/2016 | Bornegard |
| 2017/0038150 A1 | 2/2017 | Kalbacher et al. |

FOREIGN PATENT DOCUMENTS

| CN | 105705284 A | 6/2016 |
| JP | H09-178384 A | 7/1997 |

(Continued)

OTHER PUBLICATIONS

International Search Report for International Application No. PCT/EP2019/050993 dated May 27, 2019 (2 pages).

*Primary Examiner* — Christopher J Besler
(74) *Attorney, Agent, or Firm* — Merchant & Gould P.C.

(57) ABSTRACT

A method for producing a brazed plate heat exchanger comprising a stack of heat exchanger plates provided with a pressed pattern adapted to provide contact points between neighboring heat exchanger plates, such that the heat exchanger plates are kept on a distance from one another under formation of interplate flow channels for media to exchange heat, wherein the interplate flow channels are in selective communication with port openings for the media to exchange heat and circumferentially sealed along an outer periphery in order to avoid external leakage, comprises the following method steps: a. Calculating the position of the contact points between neighboring plates; b. Calculating a force that must be transferred by each contact point when the heat exchanger is in use; c. Based on the method steps above, calculating a necessary amount of brazing material for each contact point; d. Providing a screen for screen (Continued)

printing the brazing material onto the heat exchanger plates, wherein the screen is provided with openings, the size, position, plate thickness and shape of which being adapted to provide the necessary amount of brazing material to each contact point; e. Screen printing the heat exchanger plates with brazing material using the screen; f. Stacking the heat exchanger plates in a stack; and g. Brazing the stack of the heat exchanger plates in order to join the plates together to form the heat exchanger.

8 Claims, 1 Drawing Sheet

(56) References Cited

FOREIGN PATENT DOCUMENTS

| | | |
|---|---|---|
| JP | 2000337789 A | 12/2000 |
| JP | 2014185803 A | 3/2013 |
| SE | 539695 | 4/2015 |
| WO | 2017167597 A1 | 10/2017 |

METHOD FOR PRODUCING A BRAZED PLATE HEAT EXCHANGER

This application is a National Stage Application of PCT/EP2019/050993, filed 16 Jan. 2019, which claims benefit of Serial No. 180045-4, filed 16 Jan. 2018 in Sweden and which application) are incorporated herein by reference. To the extent appropriate, a claim of priority is made to each of the above disclosed applications.

FIELD OF THE INVENTION

The present invention relates to a method for producing a brazed plate heat exchanger comprising a stack of heat exchanger plates provided with a pressed pattern adapted to provide contact points between neighboring heat exchanger plates, such that the heat exchanger plates, or portions thereof, are kept on a distance from one another under formation of interplate flow channels for media to exchange heat, wherein the interplate flow channels are in selective communication with port openings for the media to exchange heat and circumferentially sealed along an outer periphery in order to avoid external leakage.

PRIOR ART

In SE539695, a method for applying brazing material on a heat exchanger plate prior to brazing is disclosed. The method comprises in short applying brazing material close to, but not at, contact points between ridges and grooves of neighboring heat exchanger plates. By this method, brazing joints between the ridges and grooves will be significantly thinner than brazing joints achieved by applying brazing material at the contact point between the ridges and grooves.

By the method according to the above patent application, brazing joints having a high strength are achieved with small amounts of brazing material. This has several benefits; except from significant savings in brazing material, the risk of so-called "burn-through" of the heat exchanger plates is reduced when a brazing material being able to solve the material of the heat exchanger plates is used as a brazing material.

Astonishingly, it has been shown that the amount of brazing material applied close to, but not at, contact points will not affect the strength of the brazing joint significantly. This is probably due to the fact that if more brazing material is used, the sheet metal from which the heat exchanger plate is made will suffer from more erosion due to the brazing material dissolving part of the plate thickness. However, the overall strength of the brazing joint will be higher if more brazing material is used, but the difference is smaller than could be expected.

It is the object of the present invention to optimize the amount of brazing material applied close to or at each contact point in order to obtain a brazed heat exchanger having an optimal strength for a given total amount of brazing material.

SUMMARY OF THE INVENTION

The invention solves the above and other problems by a method comprising the steps of:
i. Calculating the position of the contact points between neighboring plates;
ii. Calculating a force that must be transferred by each contact point when the heat exchanger is in use;
iii. Based on the method steps i and ii above, calculating a necessary amount of brazing material for each contact point;
iv. Providing a screen for screen printing the brazing material onto the heat exchanger plates, wherein the screen is provided with openings, the size, position, plate thickness and shape of which being adapted to provide the necessary amount of brazing material as calculated in step iii to each contact point;
v. Screen printing the heat exchanger plates with brazing material using the screen;
vi. Stacking the heat exchanger plates in a stack; and
vii. Brazing the stack of the heat exchanger plates in order to join the plates together to form the heat exchanger.

In order to achieve the maximum strength for a minimal use of brazing material, the screen openings may provide decreasing amounts of applied brazing material with increasing distance from the port openings.

In order to seal the internal flow channels from external leakage, the circumferential seal may be provided by circumferential skirts provided at each heat exchanger plate, wherein the skirts of neighboring plates are adapted to contact one another in an overlapping manner.

Preferably, the heat exchanger plates are generally rectangular and the port openings are placed near corners of the heat exchanger plates. This is beneficial in that it is possible to utilize sheet metal in the form of coils in a material efficient manner.

In order to provide a brazing connection having a minimal thickness, the brazing material may be placed in the shape of "double dots" on either sides of each contact point. The double dots may have a circular circumference, a square shape, an oblong shape, a shape resembling half moons or a shape of parenthesis signs.

BRIEF DESCRIPTION OF THE DRAWINGS

In the following, the invention will be disclosed by examples of preferred embodiments with reference to the appended drawings, wherein.

DESCRIPTION OF EMBODIMENTS

Figure 1:
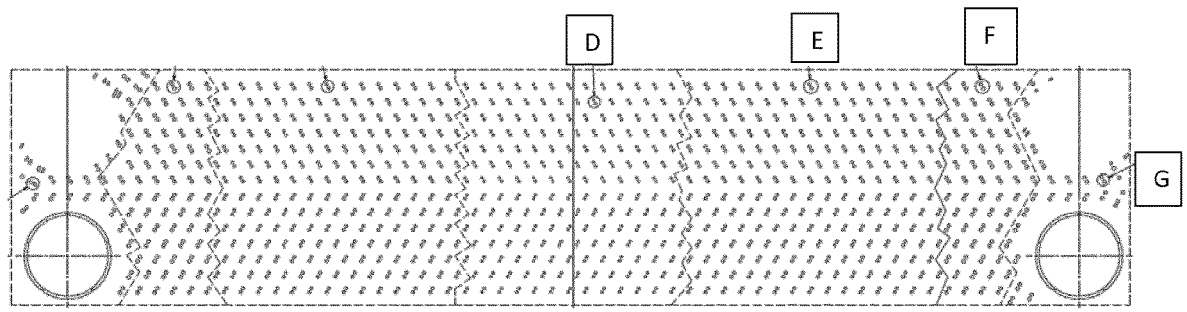
FIG. 1 is a plan view of a screen—or stencil—used to screen print a heat exchanger plate with a brazing material prior to brazing.

In the following, the invention will be described with reference to preferred embodiments thereof. However, first, a brief explanation of some basic properties will be made:

The invention is useful for producing brazed heat exchangers. Brazed heat exchangers comprise a number of heat exchanger plates provided with a pressed pattern comprising ridges and grooves adapted to form contact points between neighbouring plates when the plates are placed in a stack.

By the contact points, the plates will, apart from the contact points, be held on a distance from one another, such that interplate flow channels for media to exchange heat are formed between the plates. The interplate flow channels are circumferentially sealed by an edge seal—commonly in the form of a skirt extending along the entire periphery of the plates, wherein the skirts of neighbouring plates are adapted to overlap one another and hence form a circumferential seal stopping leaks from the interplate flow channels.

The interplate flow channels communicate with port openings, which generally are placed near corners of the heat exchanger plates. In most cases, four port openings are provided: inlet and outlet openings for a first fluid and inlet and outlet openings for a second fluid. The inlet and outlet openings for the first fluid communicate with one another by a first set of interplate flow channels, and the inlet and outlet openings for the second fluid communicate with one another by a second set of interplate flow channels. Generally, the flow channels of each set of flow channels are arranged such that every other flow channel is comprised in the first set of flow channels and the other flow channels are comprised in the second set of flow channels.

The selective communication between the port openings and the flow channels is often achieved by providing areas surrounding the port openings on different heights, such that the areas surrounding the port openings of neighbouring plates either contact one another or not contact one another—if the areas contact one another, there will be no communication between the port opening and the interplate flow channels between the neighbouring plates when brazed together, whereas there will be a communication if the areas do not contact one another.

During operation, it is common that the fluids to exchange heat with one another have a pressure exceeding the surrounding atmospheric pressure. The forces resulting from such a pressure will urge the neighbouring plates away from one another, and in order to keep the plates together, the contact points between the ridges and grooves of neighbouring plates must transfer a force from plate to plate. This force will depend on the pressure and the area for which each contact point must transfer the force resulting from the pressure.

As could be understood, the brazing joints in the vicinity of the port openings must transfer a rather large force, since the port opening area will be exposed to the fluid pressure and since there are no contact points in the port openings. Hence, the entire force exerted by the fluid pressure must be transferred by a few contact points only.

With reference to FIG. 1, an application pattern of brazing material to a heat exchanger plate prior to brazing is shown schematically. As can be seen, the brazing material is applied in pairs of dots in the form of "double dots". Each of the dots in each pair is placed such that it will neighbor a contact point between a ridge and a groove of neighbouring heat exchanger plates. Alternatively, the brazing material may be provided as a single dot, wherein the dot is placed in the contact point between the ridges and the grooves of the neighbouring plates. The dots may have any shape, e.g. have a circular circumference, a square shape or an oblong shape. In case double dots are used, a shape resembling a half moon or a parenthesis sign of each dot has been proven to give good results—if any of these two shapes is used, the openings of the parenthesis signs or the half moons of each pair shall face one another in the same manner as parenthesis signs are used in text.

Preferably, the brazing material dots are applied by screen printing, i.e. a printing technology based on placing a screen, or stencil, over the area to be selectively applied with a brazing material, wherein the screen or stencil is provided with openings having a size, shape and position corresponding to the desired brazing material application pattern.

As well known by persons skilled in the art of brazed heat exchangers, such heat exchangers tend to break in the vicinity of the port areas if subjected to a too high pressure, due to reasons given above.

Accordingly, the size of the openings of the screen is larger in the vicinity of the port openings. A larger screen opening will give more brazing material, and hence a larger brazing joint. Although a brazing joint comprising a lot of brazing material will be weaker per area unit, it will be larger, and hence able to transfer a larger force. Using a lot of brazing material for brazing one contact point will also increase the risk of burn-through in case a brazing material able to solve the base material is used. It should be noted, however, that the burn-through is not only dependent on the amount of brazing material. Other factors, such as temperature and time are also important. In a heat exchanger wherein all contact points have been applied with equal amounts of brazing material, a certain percentage of the brazing points may burn through the base material. If a smaller amount of brazing material is used, the percentage will be lower. It should be noted that the percentage of burn-through is very low even for the points where the largest amount of brazing material is applied, but the percentage will drop to even lower percentages if a smaller amount of brazing material per contact point is used.

Hence, by varying the amount of brazing material applied close to or at the contact points such that a large amount of brazing material is applied close to or at contact points subject to a large force and a smaller amount of brazing material is applied close to or at the contact points required to transfer a smaller force, some unexpected and combined benefits are achieved:

1. The amount of brazing material required to manufacture a heat exchanger is reduced;
2. The risk of burn-through is reduced;
3. The burst strength of the heat exchanger will be equal to a heat exchanger wherein all brazing joints have been applied with brazing material to the same extent as the brazing joints being subject to large force.

Figure 2:
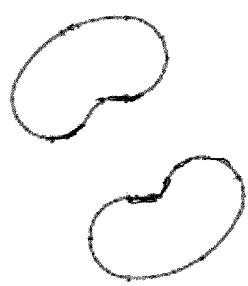
FIGS. 2-5 are plan views of exemplary shapes of openings in the screen.

Again, with reference to FIG. 1, an example of how different brazing material application patterns can be used is shown. In FIG. 1, the brazing material application pattern for the contact points near the openings are shaped according to what is shown in FIG. 2, i.e. the brazing material is applied in form of kidney shaped dots, wherein open ends of each kidney shape face one another for each pair of dots. The total area of the two dots is comparatively large, meaning that a comparatively large amount of brazing material will be applied close to the contact points in the vicinity of the port openings. The application pattern according to FIG. 2 is used in a zone G.

Figure 4:
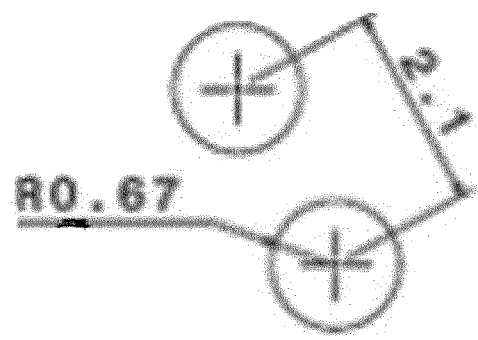
Figure 3:
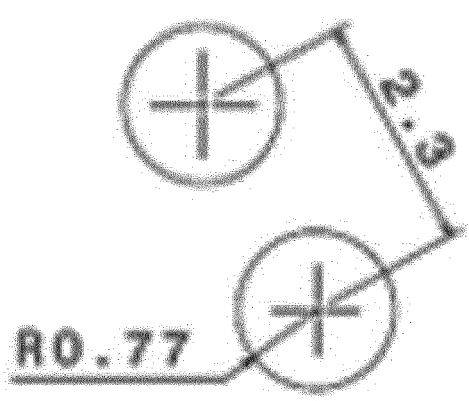

Neighboring the zone G, a zone F delimits an area wherein the brazing material is applied according to FIG. 3, i.e. as two circular surfaces. In the shown example, the circular surfaces have a radius of 0.77 mm. In a neighboring zone E, the brazing material is applied according to FIG. 4, i.e. as a circular surface having a radius of 0.67 mm and in a zone D neighboring the zone E, the brazing material is applied as circular surfaces having a diameter of 0.58 mm.

In the areas D, E and F, there is an area ratio of 1.76 between the largest circular points (diameter of 0.77 mm) and the smallest circular areas (0.58 mm). The area ratio between the largest and smallest points may, however, be varied within wide limits without departing from the scope of the invention. For example, the area ratio may range from 1.1 to 10, depending on the force requirements of each brazing joint.

It should be noted that the amount of applied brazing material in the zones D-G decreases with increasing distance from the port openings. This is due to the fact that the average contact point surface density becomes larger the longer from the port openings, meaning that each contact point is subjected to a smaller force.

Figure 5:
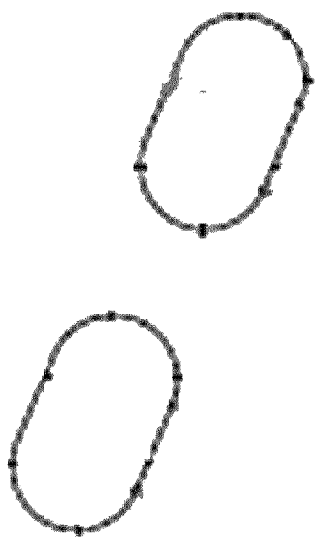

In FIG. 5, another possible shape for the brazing material application pattern is shown. According to FIG. 5, the brazing material is applied as two oblong areas. This shape is beneficial in that it allows for a rather large amount of brazing material to be applied without departing from the central portion of the ridge where the brazing material is applied.

As an alternative or complement to adapt the shape of the openings in the stencil in order to obtain various amounts of brazing material application, it is also possible to use a screen having a varying thickness—in areas where the screen is thick, a certain application pattern will give a large amount of applied brazing material, if the screen is thin, the amount of brazing material will be smaller.

By combining a screen having a various thickness and various shape of the openings in the screen, it is possible to vary the amounts of applied brazing material within very wide limits. For a given screen thickness, there is a smallest possible opening size, since there is a "release limit" for every given screen thickness. In short, the release limit is the limit where the brazing material will stick more to walls of the opening than to the surface onto which it is applied. If the release limit is exceeded, there will no brazing material application. The release limit will vary depending on a lot of factors, but generally speaking, a thin screen will enable smaller openings than a thick screen. Hence, by varying both the opening size and the screen thickness, a larger variety of applied brazing material amount may be achieved.

The invention claimed is:

1. A method for producing a brazed plate heat exchanger comprising a stack of heat exchanger plates provided with a pressed pattern adapted to provide contact points between adjacent heat exchanger plates of said stack of heat exchanger plates, such that the heat exchanger plates are kept on a distance from one another under formation of interplate flow channels for media to exchange heat, wherein the interplate flow channels are in selective communication with port openings for the media to exchange heat and circumferentially sealed along an outer periphery in order to avoid external leakage, wherein the method comprises:
   (a) calculating a position of the contact points between the adjacent heat exchanger plates;
   (b) calculating a force that must be transferred by each of the contact points when the brazed plate heat exchanger is in use;
   (c) based on the method steps (a) and (b), calculating an amount of brazing material for each of the contact points;
   (d) providing a screen for screen printing the brazing material onto the heat exchanger plates, wherein the screen is provided with openings, having a size, position, plate thickness, and shape adapted to provide the amount of brazing material to each of the contact points;
   (e) screen printing the heat exchanger plates with the brazing material using the screen;
   (f) stacking the heat exchanger plates in a stack; and
   (g) brazing the stack of the heat exchanger plates in order to join the heat exchanger plates together to form the brazed plate heat exchanger.

2. The method according to claim 1, wherein the screen openings provide decreasing amounts of the brazing material with increasing distance from the port openings.

3. The method of claim 1, wherein the circumferential seal is provided by circumferential skirts provided on each of the heat exchanger plates, wherein the circumferential skirts of the adjacent heat exchanger plates are adapted to contact one another in an overlapping manner.

4. The method of claim 1, wherein the heat exchanger plates are generally rectangular and the port openings are placed near corners of the heat exchanger plates.

5. The method according to claim 1, wherein the brazing material is placed in the shape of double dots on either sides of each of the contact points.

6. The method according to claim 5, wherein the double dots have a circular circumference, a square shape, an oblong shape, a shape resembling half moons, or a shape of parenthesis signs.

7. The method according to claim 1, wherein a ratio between an amount of the brazing material applied at or in a vicinity of at least one of the contact points requiring a large force transmission and an amount of the brazing material applied at or in a vicinity of another at least one of the contact points requiring a small force transmission lies in a range from 1.1 to 20.

8. The method according to claim 1, wherein a ratio between an amount of the brazing material applied at or in a vicinity of at least one of the contact points requiring a large force transmission and an amount of the brazing material applied at or in a vicinity of a contact point requiring a small force transmission lies in a range from 1.1 to 10.

* * * * *